(12) United States Patent
Hanechak

(10) Patent No.: US 8,694,494 B2
(45) Date of Patent: Apr. 8, 2014

(54) SELECTING IMAGES USING ASSOCIATED KEYWORDS

(75) Inventor: Brian D. Hanechak, Waltham, MA (US)

(73) Assignee: Vistaprint Schweiz GmbH, Winterthur (CH)

(*) Notice: Subject to any disclaimer, the term of this patent is extended or adjusted under 35 U.S.C. 154(b) by 531 days.

(21) Appl. No.: 11/089,973

(22) Filed: Mar. 25, 2005

(65) Prior Publication Data

US 2006/0218522 A1    Sep. 28, 2006

(51) Int. Cl.
*G06F 7/00*    (2006.01)

(52) U.S. Cl.
USPC .................... 707/723; 382/229; 382/305

(58) Field of Classification Search
USPC .................... 707/723; 382/229, 305
See application file for complete search history.

(56) References Cited

U.S. PATENT DOCUMENTS

| | | | | |
|---|---|---|---|---|
| 6,012,069 A * | 1/2000 | Shibazaki | ............. | 1/1 |
| 2002/0178135 A1 * | 11/2002 | Tanaka | ............. | 707/1 |
| 2003/0030669 A1 * | 2/2003 | Ono | ............. | 345/747 |
| 2003/0084065 A1 * | 5/2003 | Lin et al. | ............. | 707/104.1 |
| 2003/0220913 A1 * | 11/2003 | Doganata et al. | ............. | 707/3 |
| 2004/0098399 A1 * | 5/2004 | Risberg et al. | ............. | 707/100 |
| 2004/0213458 A1 * | 10/2004 | Kanatsu | ............. | 382/181 |
| 2004/0215663 A1 | 10/2004 | Liu et al. | | |
| 2004/0249804 A1 * | 12/2004 | Nakayama et al. | ............. | 707/3 |
| 2004/0267740 A1 * | 12/2004 | Liu et al. | ............. | 707/3 |

* cited by examiner

*Primary Examiner* — Sherief Badawi
*Assistant Examiner* — Christopher J Raab
(74) *Attorney, Agent, or Firm* — Jessica Costa

(57) ABSTRACT

An automated method for identifying images in an image database based on scores assigned to a plurality of input keywords. Each input keyword is assigned a keyword score based on the number of images in the database that are associated with that keyword. Each image in the database is then assigned an image similarity score based on the keyword scores of the input keywords associated with that image. If a user selects an image in the image database and requests to see similar images, the keywords associated with the selected image are used as input keywords. Images in the database with image similarity scores indicating greatest similarity are provided to the user.

23 Claims, 3 Drawing Sheets

SELECTING IMAGES USING ASSOCIATED KEYWORDS

FIELD OF THE INVENTION

The present invention relates to image searching and more particularly to techniques for selecting images using keywords associated with the images.

BACKGROUND

Companies in the business of selling or licensing digital images for use by others and companies that provide digital images for incorporation into custom products may have tens or hundreds of thousands of photographs and illustrations available for searching by their customers. How to efficiently and easily search a very large number of digital images to locate a particular image having a desired style or content has been a chronic issue and continues to pose difficulties.

The keyword, which can be either a single word or a phrase, is the usual tool employed for searching an image database for an image having a particular desired style, feature, or content. Each image typically has a number of associated searchable keywords suggested by the image. Because different searchers may have different interests and requirements, a variety of different keywords are typically assigned.

For example, keywords typically describe the type, shape and other characteristics of the image that might be relevant to a searcher, such as Indoors, White Background, Photograph, or Square, and may specify the quantity of people or things, such as No People or Two Animals. Keywords also typically include the generic name for each significant object in the image, such as Boy, Flag, Mountain, or whatever is deemed appropriate and relevant by the individual assigning the keywords. In some cases, additional keywords may be used that are either more descriptive about a particular object in the image, such as Beagle, Age 8-10, New York City, or Brown hair, or a broader characterization of an object, such as Animal or Mammal. Keywords may identify a family relationship indicated in the image, such as Mother, or an occupation, such as Teacher, or may relate to identifiable activities taking place in the image, such as Running, Laughing, or Dining. Other keywords may identify abstract concepts or emotions conveyed by the image, such as Love, Celebration, Confidence, or Pride. Because of the many possible ways of characterizing an image and its component elements and features, it is not at all uncommon for an image to have twenty or more keywords.

While user-entered keywords are useful in screening for images of a general type or containing a particular object, the usual keyword searching system is not well suited to the process of trying to find additional images that are similar to an image being viewed. If a user wants to see additional similar images, the prior art approach is typically to present the user with a list of the keywords associated with the current image and allow the user to select individual keywords from the list to be used for another keyword search. This requires the user to study the current image and make a subjective judgment on a keyword-by-keyword basis of whether or not the aspect of the image associated with each keyword is relevant to the image that the customer hopes to find.

Some experienced users may be proficient at using keyword entry systems, but this process can be inefficient and intimidating for many users, particularly if the user is under time pressure or is not experienced in image searching, and can lead to unproductive search results. What makes a particular image similar to another image may be the overall synergistic effect created by the combination of numerous elements of the image. The user, being faced with a checklist of many keywords, may overlook or fail to appreciate how features associated with one or more keywords are contributing to the image's desirability. Out of frustration with the procedure or results of iterative keyword searches, some users may settle for an image that is not really what the user desired or may simply give up, resulting in a dissatisfied user and lost business for the company.

Automated solutions have been attempted that approach the image similarity problem by analyzing the form and structure of the image based on wavelet signatures, color histograms, or other technical analyses. These are of no use if what interests the user is not amenable to this kind of analysis, such as a particular emotion, abstract concept, or business activity depicted in the image.

There is, therefore, a clear need for a method of identifying images of potential interest that lends itself to embodiments allowing use by busy or unsophisticated users.

SUMMARY

The present invention is directed to a method for satisfying the need for a process for selecting images in an image database based on assigning a keyword score to keyword inputs and identifying images of interest based on those keyword scores.

To select images according to one embodiment of the invention, each of a plurality of input keywords is assigned a keyword score based on the number of stored images associated with that keyword. The stored images are assigned image similarity scores based on the keyword scores of the input keywords associated with that image. Images are then selected based on their image similarity scores.

A more complete understanding of the features and advantages of the present invention will become apparent upon examination of the following description, drawings, and appended claims.

DETAILED DESCRIPTION

Figure 1:
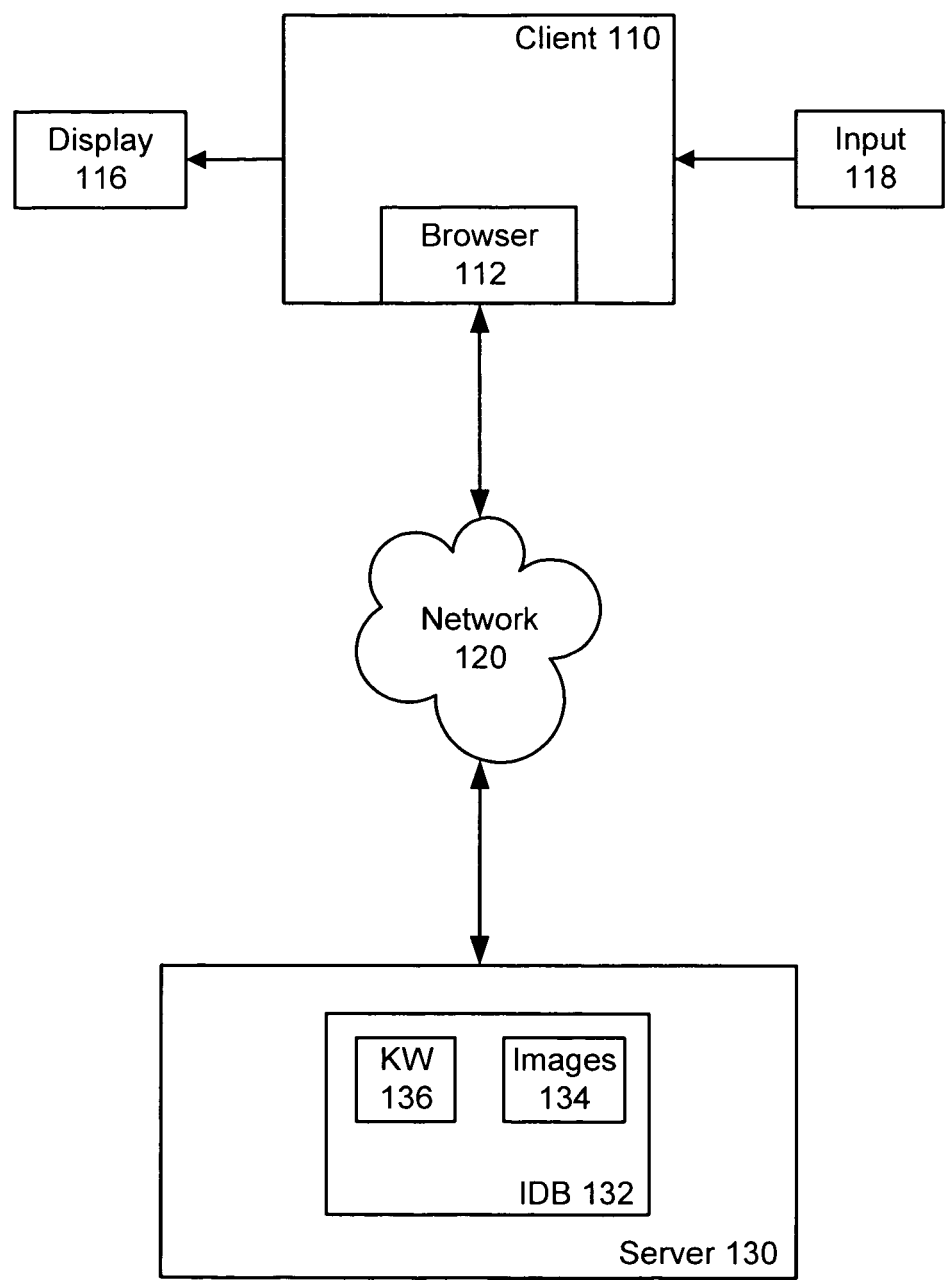
FIG. 1 is a block diagram of a networked computing environment in which the invention can be employed.

Referring to the embodiment depicted in FIG. 1, client 110 is a typically equipped personal computer, portable computer, or other system capable of communicating with server system 130 via network 120. In the disclosed embodiment, client 110 is executing browser program 112 and network 120 is the World Wide Web, but in other embodiments could be an intranet or local network. Client 110 includes a user display 116 capable of displaying text and images to a user of the system and one or more user data input devices 118, such as a keyboard and a mouse. The user of client 110 could be a customer of the operator of server 130 or could be an employee or agent of the operator of server 130. While a single client 110 is shown in FIG. 1, a number of clients 110 could be simultaneously interacting with server 130.

Server 130 is a server system such as is typically operated by an image licensing companies, vendors of custom products, and other enterprises whose business activities involve the retaining of a database of images searchable by keywords.

While server 130 is depicted in FIG. 1 as a single block, it will be understood that server 130 could be comprised of multiple servers, data storage systems, and other equipment and devices configured to communicate and operate cooperatively.

The memory system of server 130, which could be comprised of multiple storage systems and devices, retains image database IDB 132 that is accessible by remote client 110 via network 120. Images 134 contains a large number of different photograph and illustration images provided by the operator of server 130 and made available for searching by users of client systems 110. Multiple versions of each image are stored in Images 134, such as a relatively small thumbnail version for displaying at client 110, a larger version for displaying at client 110 to allow the user to examine the image in more detail, and one or more high resolution versions suitable for printing on high quality printing systems. KW 136 contains the searchable keywords associated with the images in images 134.

A user of client 110 wanting to search server 130 for a desired image would typically be required to access the server and step through one or more intermediate display screens to arrive at a keyword searching screen (not shown). At the keyword searching screen, the user will typically be presented with a text entry field, allowing the user to enter one or more words or phrases, and a button or other means allowing the user to initiate an image search when the user has finished entering the desired search terms in the text field. The techniques for designing and executing this type of keyword searching are well known in the art.

In response to the keyword search request submitted by the user of client 110, server 130 will compare the user's search term or terms with the keywords in KW 136 to identify images in images 134 having a keyword that matches one or more of the search terms. If the user's search term or terms are very specific or arcane, the search may find only a few images, or possibly no images at all, with matching keywords. On the other hand, if the user's search term or terms are common keywords, the search may identify a very large number of images. If at least one image is identified matching a search term, server 130 will retrieve the associated thumbnail version of that image or images from images 134 and assemble a search results display for displaying to the user of client 110. If a large number of images matching one or more search terms are identified, server 130 will typically initially retrieve and display the thumbnails for only a subset of the images with additional thumbnails being retrieved and displayed upon user request.

Figure 2A:
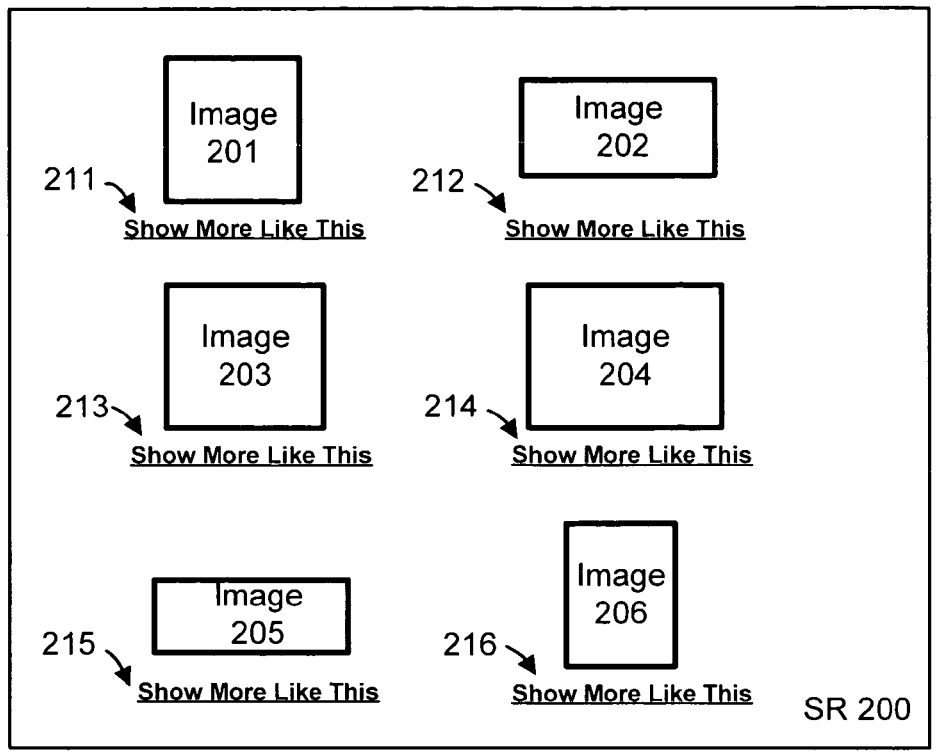
FIGS. 2A and 2B are simplified representations of image review displays presented to a user of client 110.

FIG. 2A is a simplified depiction of a search results screen displayed to the user of client 110. In the embodiment depicted, SR 200 is capable of displaying six thumbnail images at one time. The exact number is not relevant and SR 200 could be implemented to simultaneously display more or fewer thumbnails. For simplicity and ease of discussion, it will be assumed that a keyword search performed by the user identified six images 201-206. If the number of images identified is greater than can be simultaneously displayed to the user on SR 200, SR 200 could be presented with a scroll bar, or, if a large number of images had been identified, the images could be presented on multiple different SR 200 screens, or a combination of these two techniques.

In the disclosed embodiment, associated with each thumbnail image 201-206 is an active "Show More Like This" link 211-216. If the user sees an image that is generally appealing to the user, but not exactly what the user would like, the user can request to see similar images by clicking on the Show More Like This link associated with that image. This user action will initiate the automated image search process, as will be described below. It will be understood that supplying a separate search initiation link for each individual image is not essential and other techniques for selecting an image and initiating the search process could be employed. In a typical embodiment, each thumbnail image 201-206 would also have additional associated active links (not shown) allowing the user to perform various other actions, such as adding the image to the user's shopping cart, requesting to see pricing for the image, requesting to incorporate the image into a product being designed, or whatever additional functions the operator of server 130 desires to provide to the user in furtherance of the operator's business.

Figure 2B:
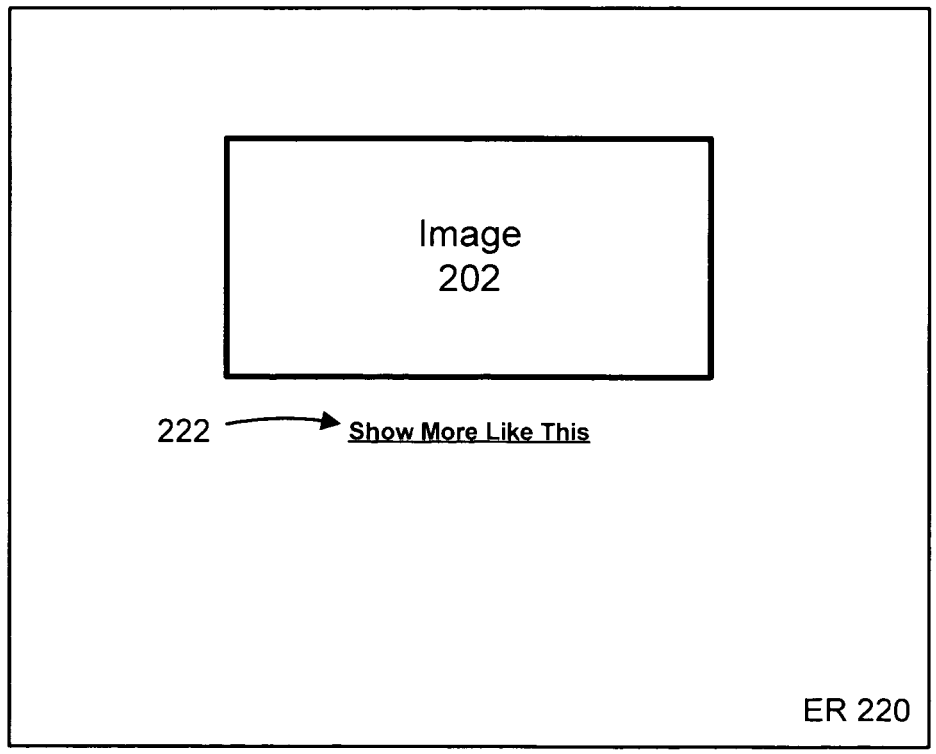

If a user desires to see a larger version of one of the thumbnail images in SR 200, the user can request an enlarged version by, for example, moving the mouse cursor over the selected image and clicking. In response to the user's selection action, server 130 will retrieve a larger display version from images 134 and forward an enlargement review screen to client 110. For example, if the user selected image 202 in SR 200, enlargement review screen ER 220, as depicted in simplified form in FIG. 2B, would be displayed to the user at client 110. ER 220 displays image 202 at a larger size, allowing closer inspection by the user, and displays a Show More Like This link 222. ER 220 would also typically include other links allowing the user to perform other actions, as mentioned above in connection with SR 200. If desired by the operator of server 130, ER 220 could also include various additional details about the selected image, such as image copyright information, usage pricing, and a list of the keywords associated with the selected image.

Figure 3:
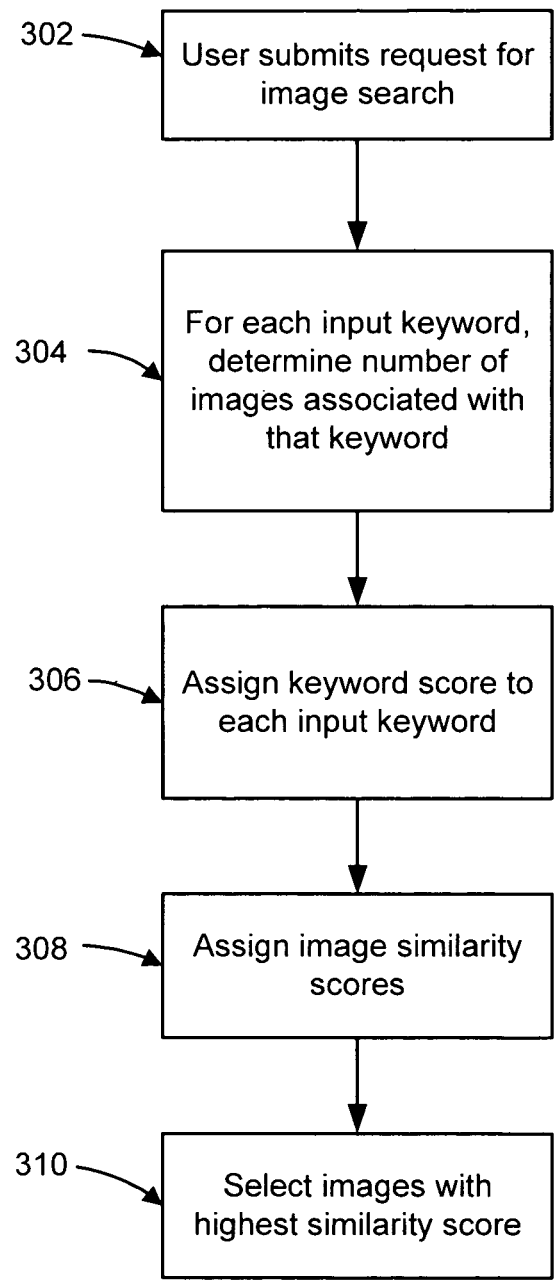
FIG. 3 is a flow diagram of a method of selecting images.

Looking now at FIG. 3, an exemplary method of identifying images to be displayed to the user in response to a user request to see similar images will be discussed. At step 302, the user indicates a desire to see images that are similar to a current image by clicking on the Show More Like This link associated with the current image from either SR 200 or ER 220. At step 304, for each keyword associated with the selected image, the total number of images in images 134 that are associated with that keyword is determined.

At step 306, a keyword score (KWS) is calculated for each of the keywords associated with the selected image. The KWS is calculated in a manner that gives keywords that are relatively less common a somewhat greater, but in most situations not an overwhelmingly greater, influence on the selection of similar images than keywords that are relatively more common while still giving even very common keywords a score that is potentially significant and influential in the similar image selection process.

In an exemplary embodiment, the KWS for each keyword is computed as the inverse of the base 10 logarithm of the total number of images (N) in images 134 that are associated with that keyword. That is, the keyword score is calculated according to the formula: $KWS = 1/\log N$. It will be understood that use of this specific formula is not essential and that other formulas of a logarithmic or other nature for calculating a relative weighting for the keywords associated with an image based on the frequency of appearance of those keywords with other images could be employed.

In the disclosed embodiment, the highest possible KWS for a keyword would result from the situation where only the current image and one other image in images 134 have that keyword in common (i.e., N=2). As the number of other images associated with a keyword increases, the KWS for that keyword declines, but at a decreasingly slower rate as the keyword becomes more common such that even very common keywords will have a KWS that is potentially significant in determining image similarity. In the event that the current image is the only image in images 134 having a particular associated keyword (i.e., N=1), the KWS for that keyword can be set to any desired default value because, since no other image has that keyword, it will have play no role in identifying similar images.

By way of illustration, examples of KWS scores that would be obtained for various values of N using the above formula are given in Table 1, rounded to three decimal places. All keywords in KW 136 that are not associated with the current image are assigned a KWS of zero.

TABLE 1

| N | KWS |
|---|---|
| 2 | 3.322 |
| 3 | 2.096 |
| 5 | 1.431 |
| 10 | 1.000 |
| 100 | 0.500 |
| 1000 | 0.333 |
| 10000 | 0.250 |

At step 308, an Image Similarity Score (ISS) is calculated for each image in images 134 by summing the KWS scores for all keywords associated with that image. Because all keywords not associated with the current image are assigned a KWS of zero, only those images that have one or more keywords in common with the current image will have an ISS greater than zero. It will be understood that alternate ways for performing relevant ISS calculations could be employed. For example, instead of calculating the ISS for every image in images 134, the subset of images having one or more keywords in common with the current image could first be identified and the ISS scores then calculated for only that subset of images.

At step 310, thumbnails of the images having the highest ISS scores are retrieved from images 134 and displayed to the user on a review screen SR 200 with associated Show More Like This links to allow the user to initiate another similarity search for one of the newly displayed images, if desired. The number of thumbnails of similar images provided to the user for review is an implementation decision of the operator of server 130.

In the above-described manner, by activating the link requesting to see similar images, the user initiates a similarity search based on the plurality of keywords associated with that image without the requirement for manual, and potentially inefficient, analysis and selection of individual keywords. Images are evaluated in a substantially holistic fashion. All features and attributes of a selected image, as indicated by the assigned keywords, are considered as making at least some contribution to the determination of image similarity.

While the illustrative embodiment discussed above uses the keywords associated with a selected image for determining individual keyword scores, this is not essential and input keywords could be obtained from another source. For example, in some circumstances, the user may be unwilling or unable to find an image that the user desires to use for a similarity search or the user may be experienced and desire to initiate the image search by directly entering a plurality of keywords for KWS purposes. To accommodate this type of user, the operator of server 130 could, instead of or in addition to the basic keyword search field, provide an advanced image search screen presenting a number of checkboxes and/or questions intended to prompt the user to enter a number search terms of various types. For example, the advanced search screen could provide checkboxes for quickly selecting among very common image attributes, such as photograph or illustration, indoors or outdoors location, color or black and white, vertical, horizontal or square format, and the like. For search terms requiring more flexibility, explanatory legends and associated text entry fields could be provided to solicit relevant terms, such as "Enter any physical activities desired in image (walking, talking, dancing, etc.)"; "Enter any business activities, occupations or professions desired in image"; "Enter any desired location for image (beach, city, mountain, etc.)" and "List any types of animals or objects desired in the image", and so forth. In this manner the user is encouraged to enter a variety of input terms. KWS values would be calculated for each of the entries from this screen and used to identify appropriate images in images 132 for presentation to the user.

While illustrative embodiments have been discussed, other alternate embodiments could also be employed. Therefore, the described embodiment is to be considered as illustrative rather than restrictive and the scope of the invention is as indicated in the following claims and all equivalent methods and systems.

What is claimed is:

1. A computer-implemented method for selecting from a plurality of stored images one or more images similar to a first image, the stored images and the first image each having a plurality of stored keywords associated therewith, the method comprising:

responsive to a request by a user to see similar images:
calculating, by one or more processors, a keyword score for each stored keyword associated with the first image, each keyword score being based only on the number of stored images associated with that keyword;
calculating, by one or more processors, an image similarity score for at least some of the stored images, each image similarity score being based on the keyword scores of the stored keywords associated with both that image and the first image; and
selecting, by one or more processors, one or more of the stored images having the highest image similarity scores and providing the selected images for displaying to the user;
each keyword score being calculated based on the inverse logarithm of the total number of images having the respective keyword associated therewith; and
each image similarity score being calculated by summing the keyword scores for all keywords associated with the respective image, and wherein an image similarity score is calculated only for those stored images having at least one stored keyword that is also a stored keyword of the first image.

2. The method of claim 1 wherein the first image is one of the stored images.

3. The method of claim 2 wherein the first image is selected by a user from a plurality of stored images displayed to the user.

4. The method of claim 1 wherein the first image is selected based on keywords provided by a user.

5. The method of claim 1 further comprising assigning a default keyword score to all keywords associated with the at least some of the stored images that are not keywords associated with the first image.

6. The method of claim 1 wherein the image similarity score for each image is determined by summing the keyword scores of the keywords associated with that image.

7. The method of claim 5 wherein the default keyword score is zero.

8. A method of operating a server system in communication with a client system, the server system having access to a plurality of stored images, each stored image having a plurality of stored keywords associated therewith, the method comprising:
  in response to a request by the user at a client system to see similar images to a first
  image in the plurality of stored images, performing the following steps:
    calculating, by one or more processors, a keyword score for each stored keyword associated with the first image, each keyword score being based only on the number of stored images associated with that keyword;
    calculating, by one or more processors, an image similarity score to at least some of the stored images, each similarity score being based on the keyword scores of the stored keywords that are associated with both that image and the first image; and
    selecting one or more stored images having the highest image similarity scores and providing the selected images for displaying to the user;
    each keyword score being calculated based on the inverse logarithm of the total number of images having the respective keyword associated therewith; and
    each image similarity score being calculated by summing the keyword scores for all keywords associated with the respective image, and wherein an image similarity score is calculated only for those stored images having at least one stored keyword that is also a stored keyword of the first image.

9. The method of claim 8 wherein the first image is selected by the user of the client system.

10. The method of claim 1 wherein an image similarity score is assigned only to those stored images having at least one stored keyword that is also a stored keyword of the first image.

11. The method of claim 5 wherein the image similarity score for a stored image is determined by summing the keyword scores of the keywords that are associated with both that image and the first image.

12. One or more non-transitory computer readable storage encoded with computer executable instructions for performing the method of claim 1.

13. The method of claim 8 wherein an image similarity score is assigned only to those stored images having at least one stored keyword that is also a stored keyword of the first image.

14. The method of claim 9 wherein the first image is selected from a plurality of stored images displayed to a user.

15. The method of claim 8 wherein the first image is selected based upon keywords provided by a user.

16. The method of claim 8 further comprising assigning a default keyword score to all keywords associated with the at least some of the stored images that are not keywords associated with the first image.

17. The method of claim 16 wherein the image similarity score for each image is determined by summing the keyword scores of the keywords associated with that image.

18. The method of claim 16 wherein the default keyword score is zero.

19. The method of claim 8 wherein one or more of the one or more selected stored images are provided to the client system for displaying to the user.

20. One or more non-transitory computer readable storage encoded with compute executable instructions for performing the method of claim 8.

21. A system for selecting one or more images similar to a first image, comprising:
  one or more processing units configured to receive a selection by a user of the first image from a plurality of stored images, the stored images and the first image each having one or more stored keywords associated therewith;
  one or more processing units configured to receive a request by the user to see similar images to the first image;
  one or more processing units configured to calculate, upon receipt of the request by the user to see similar image to the first image, a keyword score for each stored keyword associated with the first image, to determine an image similarity score for at least some of the stored images, and to select one or more of the stored images as similar to the first image based on the image similarity scores of the stored images, each keyword score being based only on the number of stored images associated with that keyword, and each image similarity score being based on the keyword scores of the stored keywords associated with both that image and the first image;
  each keyword score being calculated based on the inverse logarithm of the total number of images having the respective keyword associated therewith, and each image similarity score being calculated by summing the keyword scores for all keywords associated with the respective image, and wherein an image similarity score is calculated only for those stored images having at least one stored keyword that is also a stored keyword of the first image.

22. A computer-implemented method for selecting one or more images similar to a first image from a plurality of stored images each having one or more stored keywords associated therewith, the method comprising:
  responsive to a request by the user of a selection of the first image from a plurality of stored images and a request by the user to see similar images, performing the following steps:
    for each respective keyword associated with the first image, determining by one or more processors the total number of stored images associated with the respective keyword;
    calculating by one or more processors a keyword score for each respective keyword associated with the first image based only on the total number of stored images associated with the respective keyword based on computation of an inverse logarithm of the total number of images that are associated with the respective keyword;
    determining an image similarity score for at least some of the stored images by summing the keyword scores for all keywords associated with that image; and
    selecting one or more of the stored images as similar to the first image based on the image similarity scores of the stored images.

23. A system for selecting from a plurality of stored images one or more images similar to a first image from a plurality of stored images each having one or more stored keywords associated therewith, comprising:
  one or more processing units configured to receive a request by the user of a selection of the first image from a plurality of stored images and a request by the user to see similar images, and in response to the request;
  one or more processing units to determine the total number of stored images associated with the respective keyword for each respective keyword associated with the first image, one or more processing units to determine a keyword score for each respective keyword associated with the first image based on the inverse logarithm of the total number of stored images associated with the respective keyword, one or more processing units to determine an image similarity score for at least some of the stored images by summing the keyword scores for all keywords associated with that image, and one or more processing units to select as similar to the first image one or more of the stored images based on the image similarity scores of the stored images.

* * * * *